(12) United States Patent
Yamada

(10) Patent No.: US 6,600,842 B2
(45) Date of Patent: Jul. 29, 2003

(54) SEMICONDUCTOR OPTICAL FUNCTION DEVICE

(75) Inventor: Koji Yamada, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/887,424

(22) Filed: Jun. 25, 2001

(65) Prior Publication Data

US 2002/0071621 A1 Jun. 13, 2002

(30) Foreign Application Priority Data

Dec. 7, 2000 (JP) ........................................ 2000-372579

(51) Int. Cl.$^7$ ............................................. G02F 1/035
(52) U.S. Cl. .................... 385/2; 385/1; 385/3; 385/129; 385/131; 385/132; 257/458; 257/79; 257/183; 257/613
(58) Field of Search ................................. 385/1–3, 129, 385/131, 132; 257/458, 79, 183, 613

(56) References Cited

U.S. PATENT DOCUMENTS

| | | | |
|---|---|---|---|
| 4,685,763 A | * 8/1987 | Tada et al. | ...................... 385/8 |
| 5,689,122 A | * 11/1997 | Chandrasekhar | ............. 257/184 |
| 5,926,585 A | * 7/1999 | Irikawa et al. | ............... 385/131 |
| 6,005,266 A | * 12/1999 | Forrest et al. | ............... 257/258 |
| 6,215,922 B1 | 4/2001 | Okayama | |
| 6,229,943 B1 | 5/2001 | Okayama | |
| 6,268,618 B1 | * 7/2001 | Miki et al. | ................... 257/103 |

OTHER PUBLICATIONS

Hideaki Okayama, U.S. patent application Ser. No. 09/900,164, filed Jul. 9, 2001 (specification, claims and drawings).
Hideaki Okayama, U.S. patent application Ser. No. 09/821,047, filed Mar. 29, 2001 (specification, claims, drawings and declaration).

"Electroabsorption Modulators on Semi–insulating InP Substrate for High Speed Modulation", Ajisawa et al., 1990 Institute of Electronic Information and Communication Engineering, Spring National Conference, C–239, p. 4–294 (disclosed on p. 2 of the specification as "literature 2") (with partial English translation).

"High–Speed InGaAIAs/InAIAs Multiple Quantum Well Optical Modulators with Bandwidths in Excess of 20 GHZ at 1.55$\mu$m", Kotaka et al., IEEE Photonics Technology Letters vol. 1, No. 5, May 1989, pp. 100101 (disclosed on p. 2 of the specification as "literature 1").

"Electroabsorption Modulators on Semi–insulating InP Substrate for High Speed Modulation", Ajisawa et al.., 1990 Institute of Electronic Information and Communication Engineering, Spring National Conference, C–239, p. 4–294 (disclosed on p. 2 of the specification as "literature 2").

Copending U.S. Patent Application filed Mar. 4, 1998 entitled "Optical Circuit Device and Wavelength Router", by Hideaki Okayama, Ser. No. 09/034,288.

Copending U.S. Patent Application filed Mar. 30, 2001 entitled "Wavelength Router", by Hideaki Okayama, Ser. No. 09/821,047.

* cited by examiner

Primary Examiner—Robert H. Kim
Assistant Examiner—Richard Kim
(74) Attorney, Agent, or Firm—Wenderoth, Lind & Ponack, L.L.P.

(57) ABSTRACT

A semiconductor optical function device has a first junction structure part which includes a first conductivity type cladding layer, a light waveguide layer and a second conductivity type cladding layer, and a second junction structure part which includes the first conductivity type cladding layer and the second conductivity type sub-cladding layer, and is formed at a position separated from the first junction structure part, on a substrate. Here, a first electrode is provided on the top of the first junction structure part, and a second electrode is provided on the top of the second junction structure part, and the height from the top surface of the substrate to the top surface of the first electrode, and the height from the top surface of the substrate to the top surface of the second electrode are substantially the same.

17 Claims, 9 Drawing Sheets

SEMICONDUCTOR OPTICAL FUNCTION DEVICE

BACKGROUND OF THE INVENTION

1. Field of the Invention

The present invention relates to an optical modulation device used for optical communication and light signal processing, and more particularly to a structure of an electro-absorption type light modulation device and a saturable absorption light-switching device having a semiconductor light waveguide channel structure.

2. Description of Related Art

A light modulation device having a semiconductor light waveguide channel structure generally has a P-i-N heterojunction structure where a first conductivity type semiconductor layer, a light waveguide layer, and a second conductivity type semiconductor layer are formed in this sequence on a semiconductor substrate. A reverse bias voltage is applied to the light waveguide layer from electrodes which are connected to the first conductivity type semiconductor layer and the second conductivity type semiconductor layer, respectively. By applying the reverse bias voltage, an electric field is applied to the light waveguide layer, and the light absorption factor in the light waveguide layer increases by the electro-absorption effect. The intensity of light guided into the optical modulation device is modulated by the applied reverse bias voltage.

Such an optical modulation device is disclosed, for example, in literature 1: "High-speed InGaAlAs/InAlAs Multiple Quantum Well Optical Modulators with Bandwidths in Excess of 20 GHz at 1.55 μ, Isamu Kotaka, et al, IEEE Photon. Technol. Lett., Vol. 1, No. 5, pp. 100–101, 1989; and in literature 2: "Electro-absorption Modulators on Semi-insulating InP Substrate for High Speed Modulation", Ajisawa et al., 1990 Institute of Electronic Information and Communication Engineering, Spring National Conference, C-239, p. 4–294.

In the structure of the optical modulator disclosed in the literature 1, an n-type cladding layer (n-InAlAs), a light waveguide layer (MQW), and a p-type cladding layer (p-InAlAs) are formed in this sequence on the n-type semiconductor substrate (n-InP) so as to create a P-i-N junction structure. A p-type ohmic contact layer is formed on the p-type cladding layer, and an n-type ohmic contact layer is formed on the back side surface of the n-type semiconductor substrate. A p-side electrode is connected to the p-type ohmic contact layer, and an n-side electrode is connected to the n-type ohmic contact layer. In other words, an electrode is formed at the top side surface and the back side surface of the optical modulator, respectively.

FIG. 1A is a cross-sectional view depicting an example of a configuration of a conventional plane parallel plate type optical modulation element, similar to the optical modulator disclosed in literature 1. FIG. 1B is an equivalent electric circuit diagram of a conventional plane parallel plate type optical modulation element. A double heterojunction structure part (which is called first junction structure part) 108, which comprises the first conductivity type cladding layer 102, the light waveguide layer 104, and the second conductivity type cladding layer 106, is formed on the first conductive substrate 100, and the second conductivity type side electrode 112 is formed on the second conductivity type cladding layer 106 via the second conductivity type ohmic contact layer 110. A first conductivity type side electrode 114 is formed on the back side surface of a substrate 100.

In FIG. 1B, a reference character RS shows the resistance of the double heterojunction structure part 108 which comprises the first conductivity type cladding layer 102, the light waveguide layer 104, and the second conductivity type cladding layer 106. A reference character Cj indicates the junction capacitance of the double heterojunction structure part 108. A reference character Rsub indicates the resistance of the first conductivity type substrate 100. A reference character Ce indicates inter-electrode capacitance or static capacitance between the second conductivity type side electrode 112, which is on the double heterojunction structure 108, and the first conductivity type side electrode 114 which is on the back side surface of the substrate 100.

In the structure of the optical modulator disclosed in the literature 2, the n-type etching stopper layer (n-InGaAs), the n-type cladding layer (n-InP), the light waveguide layer (i-lnGaAsP), and the p-type cladding layer (p-InP) are laminated in this sequence on the semiconductivity type semiconductor substrate, so as to form a P-i-N junction structure. The p-type ohmic contact layer (p-InGaAs) is formed on the p-type cladding layer. The layer above a part of the n-type cladding layer is formed in a stripe manner. Both sides of the stripes are buried by a high resistance insulating layer. Mesa is formed on the substrate by the striped structure and the insulating layer where both sides of the structure are buried. The p-side electrode is formed on the p-type ohmic contact layer, and the n-side electrode is formed on the n-type etching stopper layer, which is exposed from the mesa on the substrate.

However the above mentioned optical modulator has the following problems.

At first, in the case of the optical modulator disclosed in literature 1, the distance between electrodes is short since electrodes are plane parallel plates. Therefore the static capacitance is large. To implement an optical modulator which can operate faster, the static capacitance must be sufficiently small.

In the case of the optical modulator disclosed in the literature 2, the main heat generation source is a pair of the structure formed on the substrate. Therefore, when a substrate, where a light waveguide channel structure is formed, is mounted on a carrier or heat sink with the top surface of the substrate turned to the carrier or heat sink side to improve heat radiation of the optical modulator, the p-side electrode and the n-side electrode are normally bonded to the patterns, which are formed on the heat sink or on the carrier, so as to be electrically isolated from each other. However in the structure of the optical modulator disclosed in the literature 2, the p-side electrode and the n-side electrode are formed to have different heights, so the distance between the electrodes and the top surface of the heat sink or the carrier are different. More specifically, the p-side electrode formed on the top surface of the mesa is closer to the top surface of the heat sink or the carrier than the n-side electrode formed on the n-type etching stopper layer. Therefore, when the p-side electrode, which is closer to the top surface of the heat sink or the carrier, is bonded, a gap is generated between the n-side electrode and the heat sink or the carrier, and bonding the n-side electrode to the pattern is difficult. Since the contacting area between the element having a light waveguide channel structure and the heat sink or the carrier becomes small, a desired heat radiation may not be obtained. Since the contacting area, i.e., bonding area, is small, the adhesive strength between the element and the heat sink or the carrier may be weak. The electric resistance may increase because the n-side electrode cannot electrically contact the pattern formed on the heat sink or the carrier, or cannot make sufficient contact therewith. As a result, a desired long term reliability for the optical modulator may not be obtained.

SUMMARY OF THE INVENTION

It is an object of the present invention to provide a semiconductor optical function device which has better heat radiation than a prior art, excelling in long term reliability.

According to the present invention, the semiconductor optical function device comprises a first junction structure part which further comprises a first conductivity type cladding layer, a light waveguide layer, and a second conductivity type cladding layer, on a substrate, and a second junction structure part which is formed at a position on the substrate isolated from the first junction structure part, which includes the first conductivity type cladding layer and the second conductivity type sub-cladding layer. A first electrode is formed on the first junction structure part, and a second electrode is formed on the second junction structure part. Also, the heights from the top surface of the substrate to the top surface of the first electrode and the second electrode are substantially the same.

Therefore, if the device is mounted to the supporting element for heat radiation with the side where the first electrode and the second electrode are formed (top surface side of the substrate) at the side contacting the supporting element of heat radiation, the top surfaces of both the first electrode and the second electrode can be contacted to the supporting element.

Here, the supporting element for heat radiation may be a heat sink provided on the carrier or the carrier itself. In a part contacting the electrode of the supporting element for heat radiation, a pattern electrically separating the electrodes is provided. Therefore, the first electrode and the second electrode contact each pattern of the supporting element for heat radiation, respectively.

Since the heights of the top surfaces of the two electrodes are substantially the same, as described above, the contact status of the supporting element for heat radiation and the top surfaces of the two electrodes is good, and the contacting area between the supporting element of heat radiation and the electrode can be large. Therefore, the heat radiation of the device can be improved. Also, the adhesive strength between the electrode and the supporting element for heat radiation can be increased, so each electrode and the pattern provided on the supporting element can be electrically connected, and the electric resistance of the device is not increased. As a result, a desired long term reliability can be obtained.

BRIEF DESCRIPTION OF DRAWINGS

The foregoing and other objects, features and advantageous of the present invention will be better understood from the following description taken in connection with the accompanying drawings, in which.

DESCRIPTION OF THE PREFERRED EMBODIMENTS

Figure 1A:
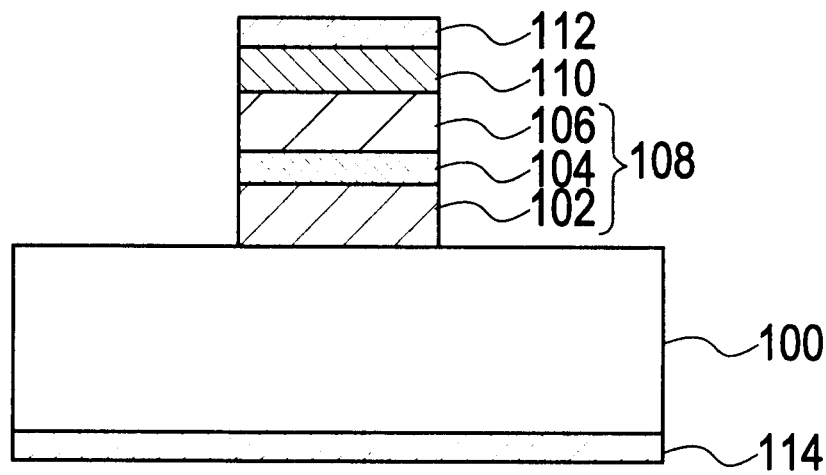
FIG. 1A is a schematic diagram depicting an example of a configuration of a conventional plane parallel plate type optical modulation element.

With reference to the accompanying drawings, detailed description will be given to embodiments of the present invention. Each drawing shows the shape, size and positional relationship of each component merely to help understand the invention, and therefore, the present invention is not restricted by the illustrated examples. In the drawings, hatching and like marks indicate that a cross-section is partially omitted.

<First Embodiment>

For the semiconductor optical function device of the first embodiment, an electro-absorption type optical modulation device for modulating the intensity of light using an electro-absorption effect will be described as an example with reference to FIG. 2 to FIG. 7B.

Figure 2:
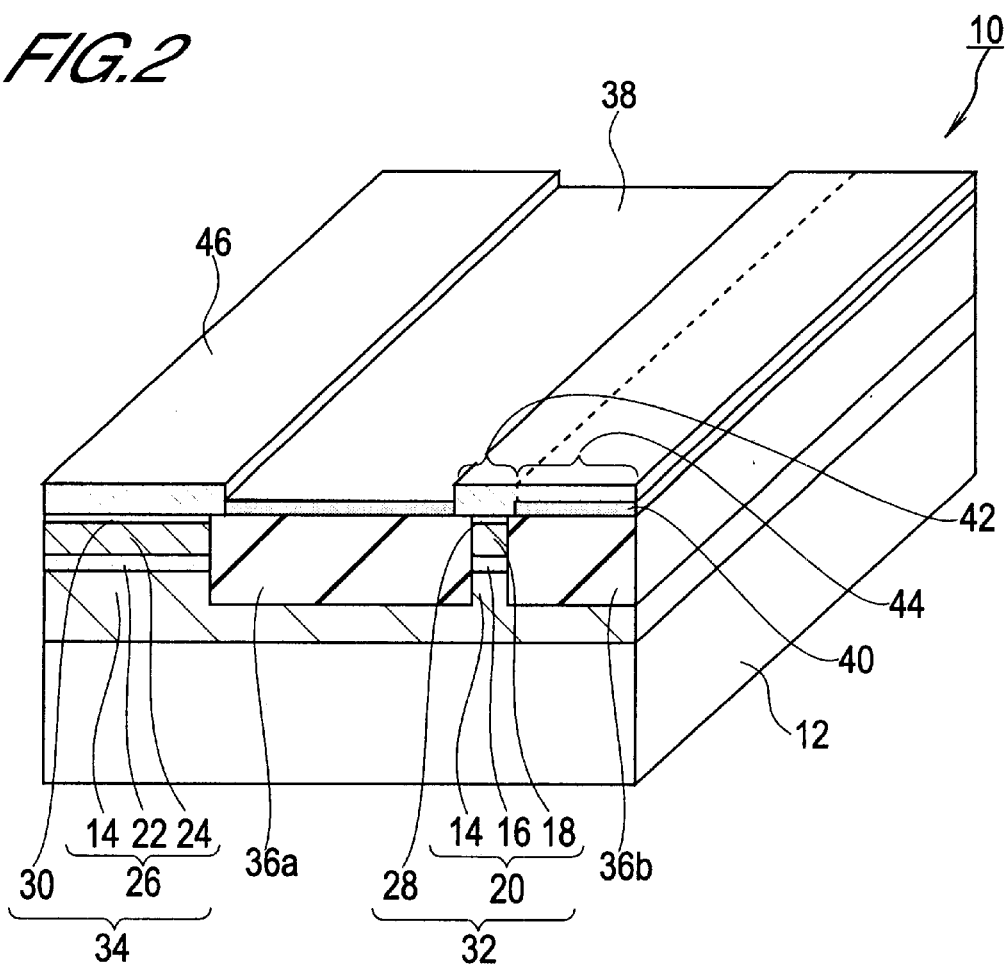
FIG. 2 is a diagram (perspective view) depicting a general configuration of a semiconductor optical modulation element of the first embodiment.
Figure 3:
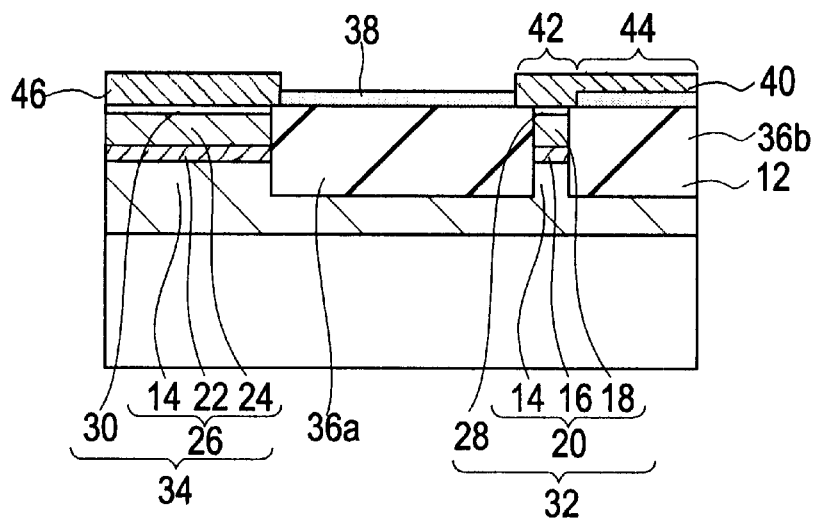
FIG. 3 is a diagram depicting a general configuration of the semiconductor optical modulation element of the first embodiment shown by a cross-sectional view.

FIG. 2 is a perspective view depicting a general configuration of an optical modulation element 10 of the electro-absorption type optical modulation device (may be simply called "optical modulation device") of this embodiment. FIG. 3 is a diagram depicting a cross-section of the element in FIG. 2, when the element is cut along a vertical plane with respect to the light waveguide direction.

The optical modulation element 10 of the optical modulation device of the present invention has a first junction structure part 20 and a second junction structure part 26 which are formed at positions isolated from each other. The first junction structure part 20 comprises a double heterojunction structure part which further comprises a first conductivity type cladding layer 14, a light waveguide layer 16, and a second conductivity type cladding layer 18 formed on a semiconductor substrate 12. The second junction structure part 26 includes the first conductivity type cladding layer 14, a non-doped (or un-doped) layer 22, and a second conductivity type sub-cladding layer 24, which are formed on the substrate 12 (FIG. 2 and FIG. 3).

In the embodiment, the substrate 12 is a Fe-doped InP substrate, which is a semi-insulating substrate.

The first conductive cladding layer 14 is an n-InP cladding layer with a 2 μm thickness. The light waveguide layer 16 is a non-doped InGaAsP layer, which has a 0.25 μm thickness and a 1.47 μm band gap wavelength. The second conductivity type cladding layer 18 is a p-InP cladding layer with a 1.5 μm thickness. The first junction structure part 20 is a P-i-N junction structure. On the p-InP cladding layer 18 of the first junction structure part 20, a p—InOaAs layer is formed as a first ohmic contact layer 28, which has a 0.2 μm thickness.

The second junction structure part 26 comprises the n-InP cladding layer 14, which is common with the first junction structure part 20, and a p-InP sub-cladding layer, which is the second conductive sub-cladding layer 24 having a 1.5 μm thickness. Between the n-InP cladding layer 14 and the p-InP sub-cladding layer 24, a non-doped InGaAsP layer, which is the non-doped layer 22 with a 0.25 μm thickness, exists. Therefore, the second junction structure part 26 has the same P-i-N junction structure as the double heterojunction structure part 20. On the p-InP sub-cladding layer 24 of the second junction structure part 26, a p+-InGaAs layer is formed as a second ohmic contact layer 30 having a 0.2 μm thickness.

The stacked layer body comprising of a part of the n-InP cladding layer 14 of the first junction structure part 20, the non-doped InGaAsP layer 16 and the p-InP cladding layer 18, and the p+-InGaAs layer 28 are processed to have a mesa shape. Both sides of the mesa-shaped part (called the "first mesa part") are buried by first insulating layers 36a and 36b, which are electric insulating layers made of polyimide or Fe-doped InP, for example. That is, a first mesa-shaped part 32 is buried by this electric insulating layer 36a and 36bso that light to the light waveguide layer 16 is confined and the electric field is contracted.

The lamination layer body comprising a part of the n-InP cladding layer 14 of the second junction structure part 26, the non-doped InGaAsP layer 22, the p-InP subcladding layer 24, and the p+-InGaAs layer 30 are also processed to have a mesa shape. The side facing the first junction structure part 20 (side facing the first mesa-shaped part 32) of this mesa-shaped part (called the "second mesa-shaped part") 34 contacts the electric insulating layer 36a.

On the top surfaces of the first insulating layer 36a and the second insulating layer 36b, passivation films 38 and 40 with a 0.1 μm thickness are formed, respectively.

A first electrode 42 is formed so as to contact the first ohmic contact layer 28. Continuing from the first electrode 42, an electrode pad 44 is formed on the second insulating layer 36b via the passivation film 40. To the first electrode 42, an electric signal is applied from the outside via the electrode pad 44.

A second electrode 46 is formed so as to contact the second ohmic contact layer 30. In this embodiment, this second electrode 46 is grounded.

In the optical modulation element 10, the height from the top surface of the semiconductor substrate 12 to the top surface of the first electrode 42, and the height from the top surface of the substrate 12 to the top surface of the second electrode 46 are substantially the same. In the embodiment, the passivation film 40, under the electrode pad 44 continuing from the first electrode 42, is a thin film with a 0.1 μm thickness, so the top surfaces of the first electrode 42 and the electrode pad 44 and the top surface of the second electrode 46 are substantially on the same plane (see FIG. 3).

Between the first electrode 42 and the second electrode 46, the P-i-N junction structure of the first junction structure part 20 and the P-i-N junction structure of the second junction structure part 26 are serially structured, sharing the N conductivity type portion (n-InP cladding layer 14). In other words, the structure between the first electrode 42 and the second electrode 46 is a P-i-N-i-P junction structure.

The gap length between the first electrode 42 and the second electrode 46 can be longer than the gap length between the electrodes of the plane parallel plate type optical modulator, so the static capacitance can be small.

When a reverse bias voltage is applied to the first junction structure part 20, the light waveguide layer 16 absorbs incident light from the outside. This operation is implemented by setting the band gap wavelength of the light waveguide layer 16 to a 30–100 nm shorter length with respect to the wavelength of the incident light. Therefore, when reverse bias voltage is applied to the first junction structure part 20, the light waveguide layer (non-doped InGaAsP layer) 16 absorbs the incident light by a electro-absorption effect, and generates many electrons and holes. At this time, forward bias is applied between the n-InP cladding layer 14 and the p-InP sub-cladding layer 24 (that is, a P-i-N junction). The electrons generated in the light waveguide layer 16 are not stored but flow to the p-InP subcladding layer 24 side, so light absorption can be continuously performed. When reverse bias voltage is applied to the first junction structure part 20, holes are injected from the p-InP sub-cladding layer 24 to the n-InP cladding layer 14. These holes couple with electrons in the n-InP cladding layer 14 and become extinct. As a result, the injection of holes from the n-InP cladding layer 14 to the light waveguide layer 16 can be suppressed. Carriers other than the carriers generated by incident light from the outside are not injected into the light waveguide layer 16. In order to control the current amplification function as a transistor of this element 10, an ideal photoelectric current conversion operation can be implemented in the light waveguide layer 16.

When forward bias voltage is applied to the first junction structure part 20, light absorption in the light waveguide layer 16 rarely occurs. At this time, in the p-tnP subcladding layer 24, electrons couple with the holes in the p-InP sub-cladding layer 24, and become extinct. Therefore, the injection of electrons into the n-InP cladding layer 24 can be prevented. Holes which migrate from the p-InP cladding layer 18 to the n-liP cladding layer 14 via the light waveguide layer 16 couple with electrons in the n-InP cladding layer 14, and become extinct, so carriers are not injected into the light waveguide layer 16. Therefore, this element 10 does not emit even if forward bias is intentionally or unexpectedly applied to the first junction structure part 20.

Figure 5:
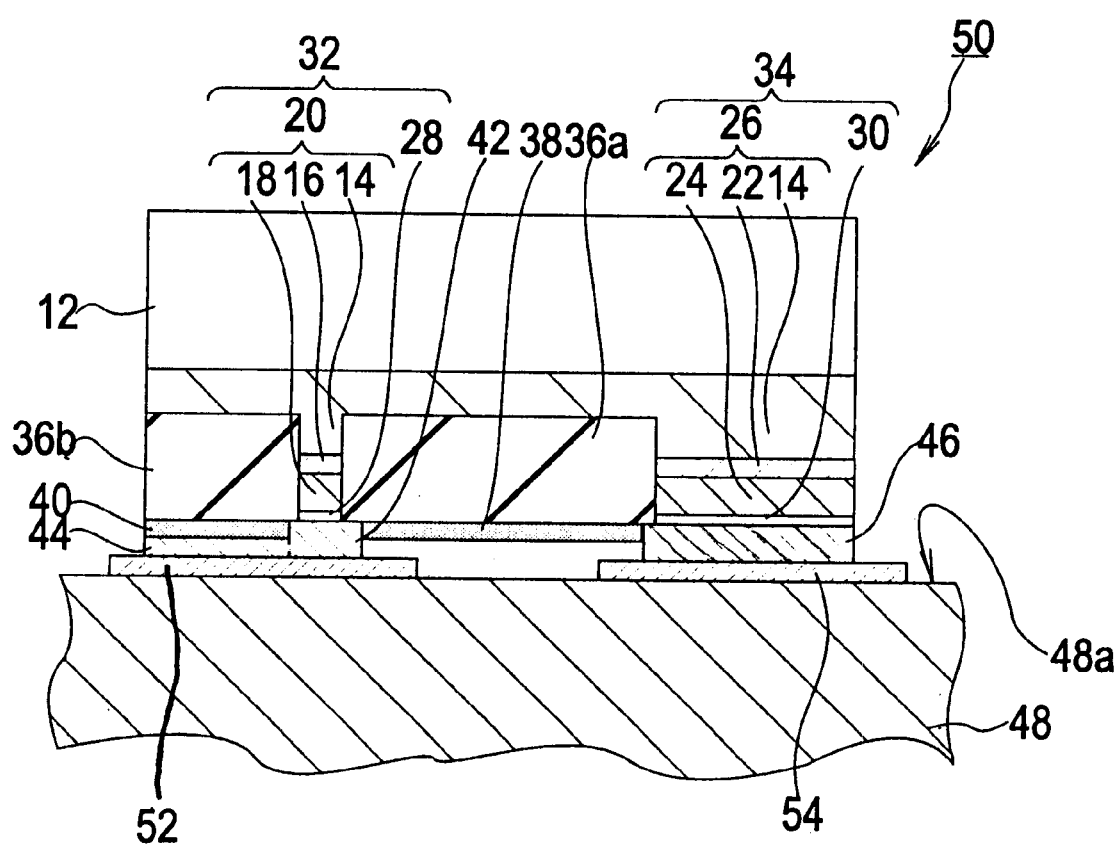
FIG. 5 is a diagram depicting a general configuration of the semiconductor optical modulation device of the first embodiment shown by a cross-sectional view.

FIG. 5 is a diagram depicting a configuration of the optical modulation device where the optical modulation element of this embodiment is mounted to the support element.

The optical modulation element 10 is mounted to a support element for heat radiation 48, and constitutes a optical modulation device 50 (see FIG. 5).

In this embodiment, the first electrode 42 and the second electrode 46 of the optical modulation device 10 are bonded to a mounting face 48a side of the support element 48 for heat radiation, which is a carrier, via an electric signal application side electrode 52 and a grounding side electrode 54, which are isolated from each other, respectively. On the mounting face 48a of the calTier 48, the top surfaces of the first electrode 42 (and electrode pad 44) and the second electrode 46 are bonded to the electric signal application side electrode 52 and the grounding side electrode 54 by a suitable method, such as soldering and thermo-compression bonding.

The heat generation source of the optical modulation device 50 is around the light waveguide layer 16. Most of the heat generated from the light waveguide layer 16 conducts to the first electrode 42 and the second electrode 46 rather than to the back surface side of the substrate 12. Therefore, the heat radiation of the device 50 can be improved by bonding the first electrode 42 and the second electrode 46 to the mounting face 48a side of the support element for heat radiation 48.

As described above, the heights from the top surface of the substrate 12 to the top surfaces of the first electrode 42 and the second electrode 46 are substantially the same. Since the first electrode 42 and the second electrode 46 can be contacted to the electric signal application side electrode 52 and the grounding side electrode 54 of the support element for heat radiation 48 without tilting the optical modulation element 10, the heat radiation of the device 50 can be further improved.

Contact between the electric signal application side electrode 52 and the first electrode 42, and contact between the grounding side electrode 54 and the second electrode 46 are good, respectively, and electric resistance, due to a contact problem between the electrode of the support element 48 and the electrode of the element, does not increase. Therefore, the optical modulation device 50 which excels in long term reliability can be obtained.

FIGS. 6A–6D and FIGS. 7A–7B are general production process diagrams of the optical modulation device shown in FIG. 5.

The optical modulation device 50 is fabricated by the following steps, for example.

Figure 6A:
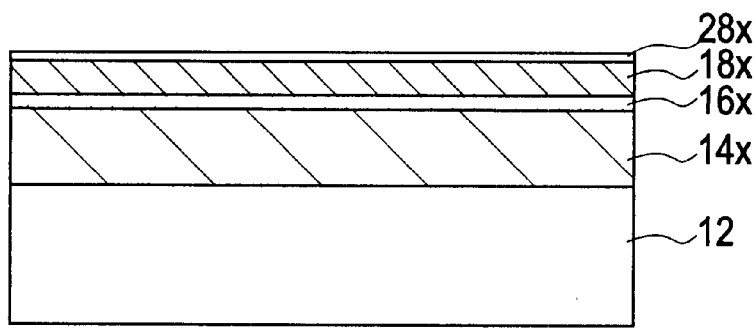
FIG. 6A, FIG. 6B, FIG. 6C and FIG. 6D are production process drawings of the optical modulation device of the first embodiment, shown by cross-sections of the structure in each major process stage.

The n-InP film 14×, non-doped InGaAsP film 16×, p-InP film 18×, and p+—InGaAs film 28× are epitaxial-grown in this sequence on the Fe-doped lin substrate 12 (FIG. 6A).

Figure 6B:
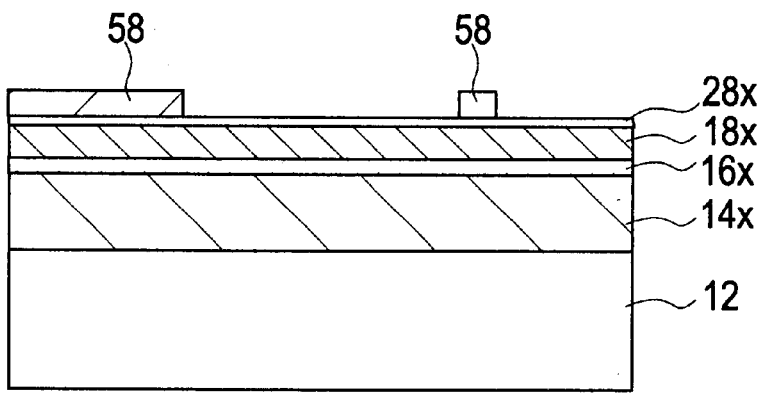

On the p+—InGaAs film 28×, SiO2 film is formed. The SiO2 film is patterned so as to remain only in portions which will later be the first mesa-shaped part and the second mesa-shaped part. The remaining part of the SiO2 film becomes a mask for etching 58 (FIG. 6B).

Figure 6C:
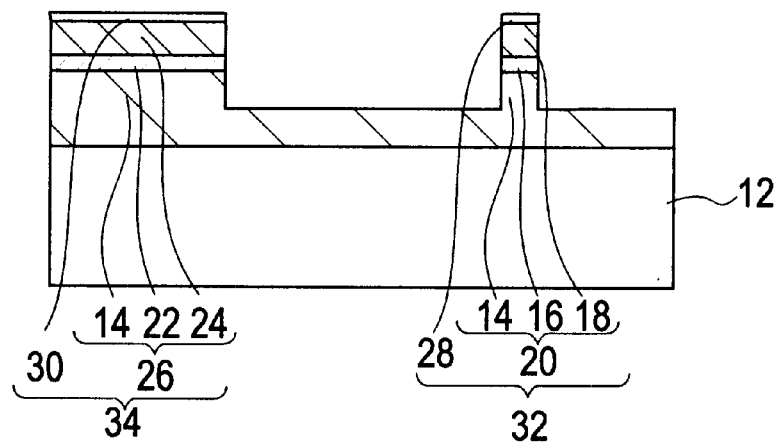

Using this mask for etching 58, dry etching is performed. The (exposed) p+—nGaAs film 28×, the p-InP film 18×, the non-doped lnGaAsP film 16× and a part of the nInP film 14×, where mask 58 is not formed, are removed by dry etching. By this, the first mesa-shaped part 32 and the second mesa-shaped part 34 are formed (FIG. 6C).

The n-InP film, which remains at the first mesa-shaped part 32 and the second mesa-shaped pail 34, becomes the n-InP cladding layer 14. The non-doped InGaAsP layer part, constituting the first mesa-shaped pail 32, becomes the light waveguide layer 16. The remaining part of the p-InP film becomes the p-InP cladding layer 18. The remaining part of the p+—InGaAs film becomes the first ohmic contact layer 28. The remaining part of the non-doped nGaAsP layer, constituting the second mesa-shaped part 34, becomes the non-doped layer 22. The remaining pail of the p-InP film becomes the p-InP sub-cladding layer 24. The remaining part of the p+—InGaAs film becomes the second ohmic contact layer 30 (FIG. 6C). By this, the first mesa-shaped part 32 includes the first junction structure part 20 in FIG. 2. The second mesa-shaped part 34 includes the second junction structure part 26 in FIG. 2.

Figure 6D:
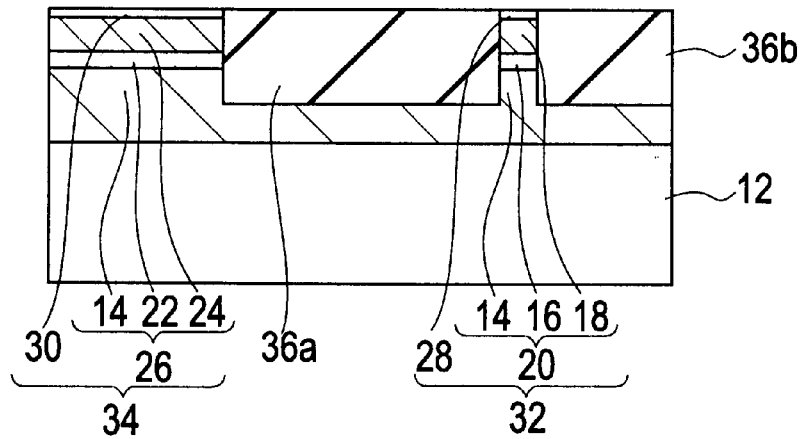

A polyimide coating film is formed to be the same height as the first mesa-shaped part 32 and the second mesa-shaped part 34 on the top surface of the exposed n-InP cladding layer 14. The coating film is cured by heat treatment. By this, the polyimide film between the first mesa-shaped part 32 and the second mesa-shaped part 34 becomes the first insulating layer 36a. The polyimide film at the side opposite from the side of the first mesa-shaped part 32 facing the mesa-shaped part 34 becomes the second insulating layer 36b (FIG. 6D).

Figure 7A:
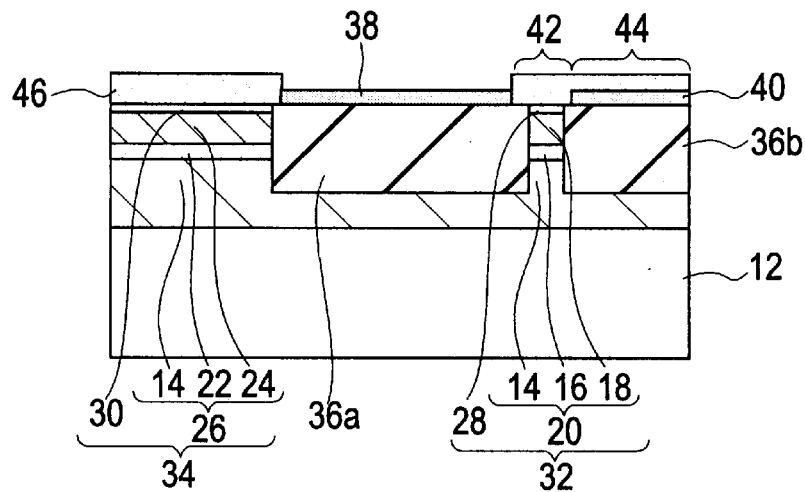
FIG. 7A and FIG. 7B are production process drawings continuing from FIG. 6.

In this embodiment, the passivation films 38 and 40 are formed on the polyimide films (first insulating layer and second insulating layer) 36a and 36b, respectively. Then Au/AuZn is deposited on the first ohmic contact layer 28 and the second ohmic contact layer 30 to have a 100 nm thickness. At this time, Au/AuZn is also deposited on the passivation film 40. After this, heat treatment is performed so that the first ohmic contact layer 28 and the second ohmic contact layer 30 and the deposited film are alloyed. On the Au/AuZn film on the alloy film and the polyimide film 36b, Ti/Pt/Au film is deposited to have a 500 nm thickness. By this, the first electrode 42 and the second electrode 46 are formed. The metal film (lamination film of Au/AuZn and Ti/Pt/Au) continuing from the first electrode 42 formed on the polyimide film 36b becomes the electrode pad 44. The heights from the top surfaces of the first electrode 42 and the second electrode 46 to the top surface of the Fe-doped InP substrate are substantially the same (FIG. 7A).

After processing through the above steps, the optical modulation device 10 shown in FIG. 2 is formed.

This optical modulation element 10 is mounted on the carrier which is the support element for heat radiation 48.

On the face 48a where the element 10 of the carrier 48 is mounted, the electric signal application side electrode 52 and the grounding side electrode 54 are formed so as to be electrically isolated from each other.

Figure 7B:
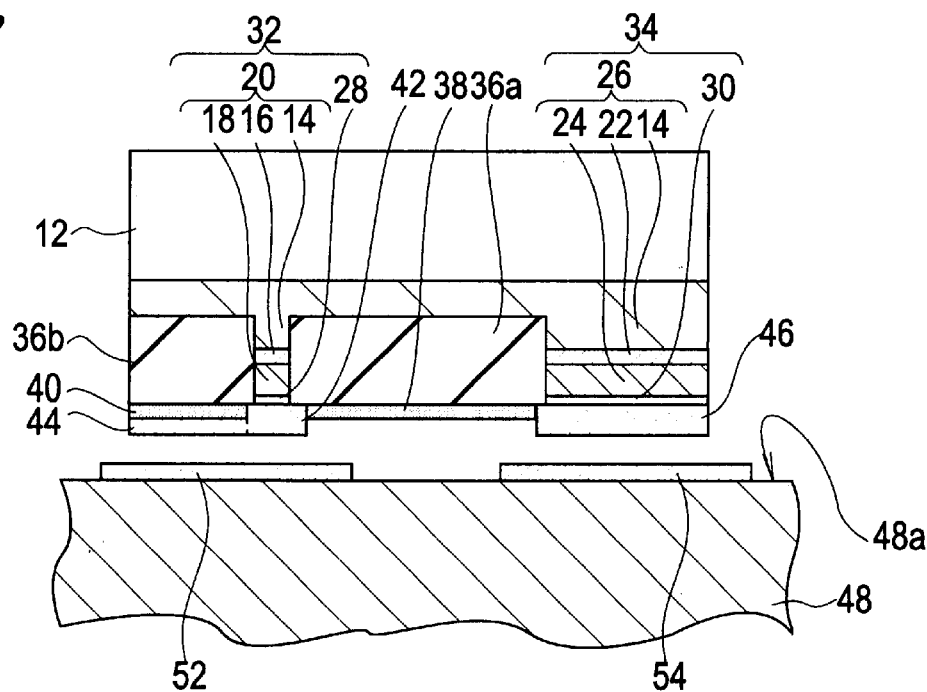

The top surfaces of the first electrode 42 and the second electrode 46 of the optical modulation element 10 are turned to the mounting face 48a side of the carrier 48 so that the electric signal application side electrode 52 and the first electrode 42 and/or the electrode pad 44 contact, and the grounding side electrode 54 and the second electrode 46 contact (FIG. 7B).

Then, the electric signal application side electrode 52 and the first electrode 42 (and/or electrode pad 44) are bonded using soldering, thermo-compression bonding or the like. At the same time, the grounding side electrode 54 and the second electrode 46 are bonded.

After processing through the above steps, the optical modulation device 50 of the first embodiment shown in FIG. 5 is obtained.

Now variant forms of the first embodiment will be described with reference to FIG. 4A–FIG. 4C.

Figure 4A:
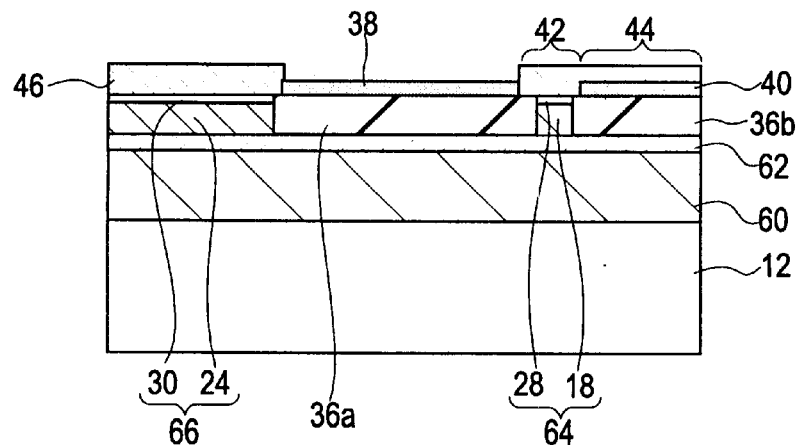
FIG. 4A, FIG. 4B and FIG. 4C are diagrams depicting configurations of variant forms of the optical modulation element of the first embodiment.

FIG. 4A is a cross-sectional view corresponding to FIG. 3, depicting the first variant form of the optical modulation element of the first embodiment.

On the entire top surface of the substrate 12, an n-InP cladding layer 60 is formed.

A non-doped InGaAsP layer 62 is formed on the top surface of the first conductivity type cladding layer 60. A first mesa-shaped part 64 comprises the p-InP cladding layer 18 and the first ohmic contact layer 28. A second mesa-shaped part 66 comprises the p-InP sub-cladding layer 24 and the second ohmic contact layer 30. On the light waveguide layer 62, other than the first mesa-shaped part 64 and the second mesa-shaped part 66, the first insulating layer 36a and the second insulating layer 36b, which are the electric insulating layers (e.g. polyimide film), are formed.

On the first insulating layer 36a and the second insulating layer 36b, the passivation films 38 and 40 are formed, respectively.

The first electrode 42 is formed on the first ohmic contact layer 28 of the first mesa-shaped pail 64. The second electrode 46 is formed on the second ohmic contact layer 30 of the second mesa-shaped part 66. The electrode pad 44 is formed on the passivation film 40. The electrode pad 44 is integrated with the first electrode 42 (FIG. 4A).

With this configuration of the optical modulation element as well, a similar function and effect as the element of the first embodiment can be obtained.

Figure 4B:
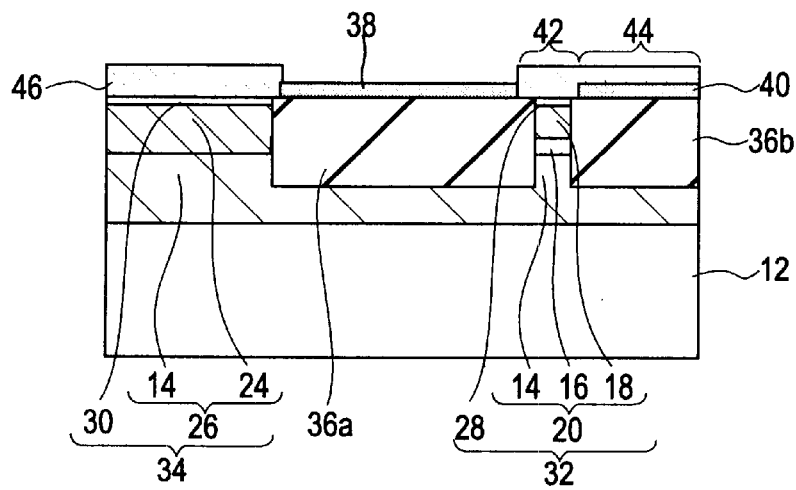

FIG. 4B is a cross-sectional view depicting a second variant form, which is different from FIG. 4A of the optical modulation element of the first embodiment.

As FIG. 4B shows, the second variant form is almost the same as the first embodiment, where the second variant form differs from the element of the first embodiment in that the second junction structure part 26 comprises the n-InP cladding layer 14 and the p-InP sub-cladding layer 24.

Therefore, the second junction structure part 26 is a homojunction structure of the n-InP cladding layer 14 and the p-InP sub-cladding layer 24. The P-i-N junction structure of the first junction structure pail 20 and the P-N junction structure of the second junction structure pail 26, which are double heterojunction structure parts are serially structured, sharing the N conductivity type portion (n-InP cladding layer 14). In other words, the junction structure between the first electrode 42 and the second electrode 46 is a P-i-N-P junction structure. If reverse bias voltage is applied to the P-i-N junction structure part of the first junction structure part 20, electrons from the carriers generated in the light waveguide layer 16 flow from the light waveguide layer 16 to the p-InP sub-cladding layer 24 side via the n-InP cladding layer 14. In the configuration of the second variant form, where an non-doped InGaAsP layer does not exist between the n-InP cladding layer 14 and the p-InP sub-cladding layer 24, the electrons flowing from the n-InP cladding layer 14 are not trapped by the non-doped layer. Since electrons flow from the n-InP cladding layer 14 to the p-InP sub-cladding layer 24 without stagnating, more light can be absorbed continuously, and operation of the element can be faster. In this element, an effect that is the same as the element of the first embodiment can also be obtained.

Figure 4C:
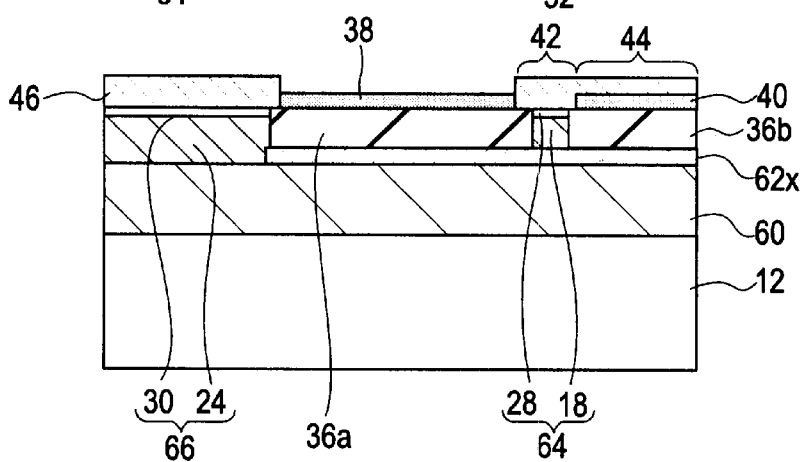

FIG. 4C shows a third variant form. The n-InP cladding layer 60 is formed on the entire top surface of the substrate 12. A non-doped InGaAsP layer 62x is formed on an area other than the second mesa-shaped part 66 on the top surface of the first conductivity type cladding layer 60. The first insulating layer 36a, the second insulating layer 36b and the first mesa-shaped part 64 sandwiched therebetween are formed on the top surface of the non-doped InGaAsP layer 62x. Just like the element configuration in FIG. 4A, the first mesa-shaped part 64 comprises the p-InP cladding layer 18 and the first ohmic contact layer 28. The second mesa-shaped part 66 comprises the p-InP sub-cladding layer 24 and the second ohmic contact layer 30, which are directly deposited on the top surface of the n-InP cladding layer 60. The passivation films 38 and 40 are formed respectively on the first insulating layer 36a and the second insulating layer 36b. The first electrode 42 is formed on the first ohmic contact layer 28. The second electrode 46 is formed on the second ohmic contact layer 30. The electrode pad 44 is formed on the passivation film 40. The electrode pad 44 is integrated with the first electrode 42 (FIG. 4C).

With this configuration of the optical modulation element as well, a similar function and effect as the element of the first embodiment are obtained. An effect similar to the element in FIG. 4B is also obtained.

For any one of the elements having the configurations shown in FIG. 4A–FIG. 4C, it is preferable to turn the first electrode 42 and the second electrode 46 side of the element to the mounting face of the supporting element for heat radiation to mount the element to the support element for heat radiation, to constitute the optical modulation device.

<Second Embodiment>

As a second embodiment, a configuration example which can further decrease the capacitance of the optical modulation device of the first embodiment will be described with reference to FIG. 8–FIG. 12.

Figure 8:
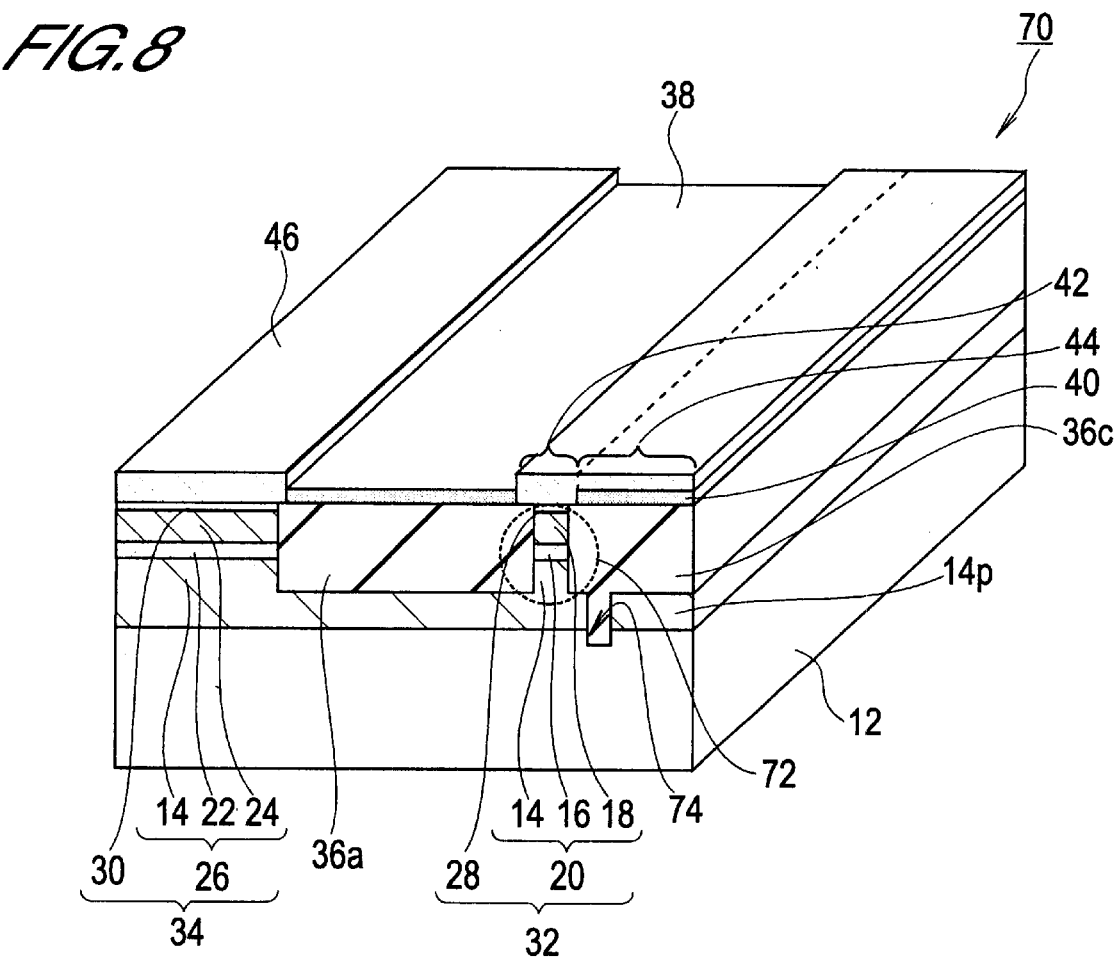
FIG. 8 is a diagram (perspective view) depicting a general configuration of the semiconductor optical modulation element of the second embodiment.
Figure 9:
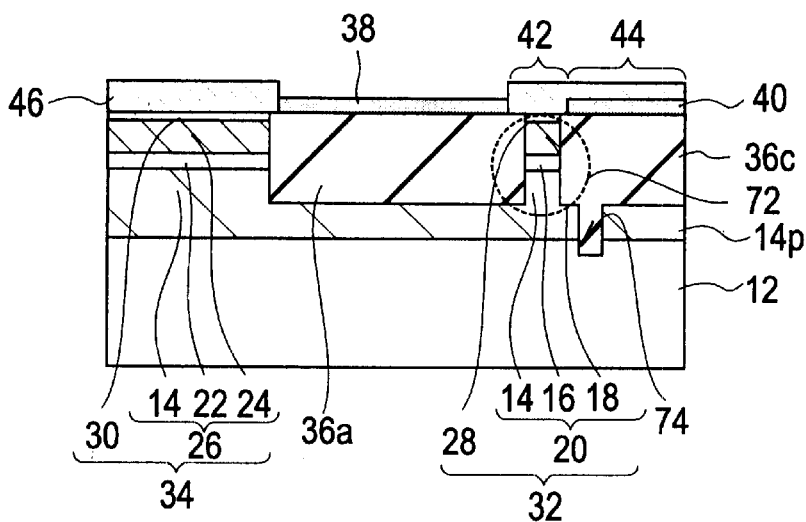
FIG. 9 is a diagram depicting a general configuration of the semiconductor optical modulation element of the second embodiment shown by a cross-sectional view.

FIG. 8 is a perspective view schematically depicting a configuration of an optical modulation element 70 of the second embodiment. FIG. 9 shows a cross-section when the element shown in FIG. 8 is cut along a vertical plane with respect to the light waveguide direction.

The optical modulation element 70 of the optical modulation device of the second embodiment comprises a first junction structure part 20 and a second junction structure part 26 which are formed at positions isolated from each other, just like the first embodiment. The first junction structure part 20 further comprises a double heterostructure part comprising a first conductivity type cladding layer 14, which is an n-InP cladding layer formed on the substrate 12, that is, the Fe-doped InP substrate, a light waveguide layer 16, which is the non-doped InGaAsP layer, and a second conductivity type cladding layer 18, which is the p-InP cladding layer. The second junction structure part 26 includes the first conductivity type cladding layer 14, which is the n-InP cladding layer formed on the substrate 12, the non-doped layer 22, which is a non-doped InGaAsP layer, and the second conductivity type sub-cladding layer 24, which is the p-InP sub-cladding layer (FIG. 8 and FIG. 9).

A first ohmic contact layer 28 is formed on the p-InP cladding layer 18. A second ohmic contact layer 30 is formed on the p-InP sub-cladding layer 24. The first ohmic contact layer 28 and the second ohmic contact layer 30 are p+—InGaAs layers, for example, just like in the first embodiment.

The lamination layer structure of a part of the n-InP cladding layer 14 of the first junction structure pail 20, the non-doped InGaAsP layer 16, the p-InP cladding layer 18 and the p+—InGaAs layer 28 is processed into a mesa shape, and constitutes a first mesa-shaped part 32. The lamination layer structure of a part of the n-InP cladding layer 14 of the second junction structure pail 26, the non-doped InGaAsP layer 22, the p-lInP sub-cladding layer 24, and the p+—InGaAs layer 30 is also processed to a mesa shape, and constitutes a second mesa-shaped pail 34.

Both sides of the first mesa-shaped part 32 are buried by a first insulating layer 36a and a second insulating layer 36c, which are electric insulating layers. By this buried structure, light into the light waveguide layer 16 is confined, and the electric field is contracted.

Passivation films 38 and 40 are formed respectively on the top surfaces of the first insulating layer 36a and the second insulating layer 36c.

A first electrode 42 is formed so as to contact the first ohmic contact layer 28. And continuing from the first electrode 42, an electrode pad 44 is formed on the second insulating layer 36c via the passivation film 40.

An electric signal is applied to the first electrode 42 via the electrode pad 44.

The second electrode 46 is formed contacting the top surface of the second ohmic contact layer 30; and the second electrode 46 is grounded.

The optical modulation element 70 is formed such that the height from the top surface of the semiconductor substrate 12 to the top surface of the first electrode 42 and the height from the top surface of the semiconductor substrate 12 to the top surface of the second electrode 46 become substantially the same, just like the first embodiment (FIG. 9).

Figure 11:
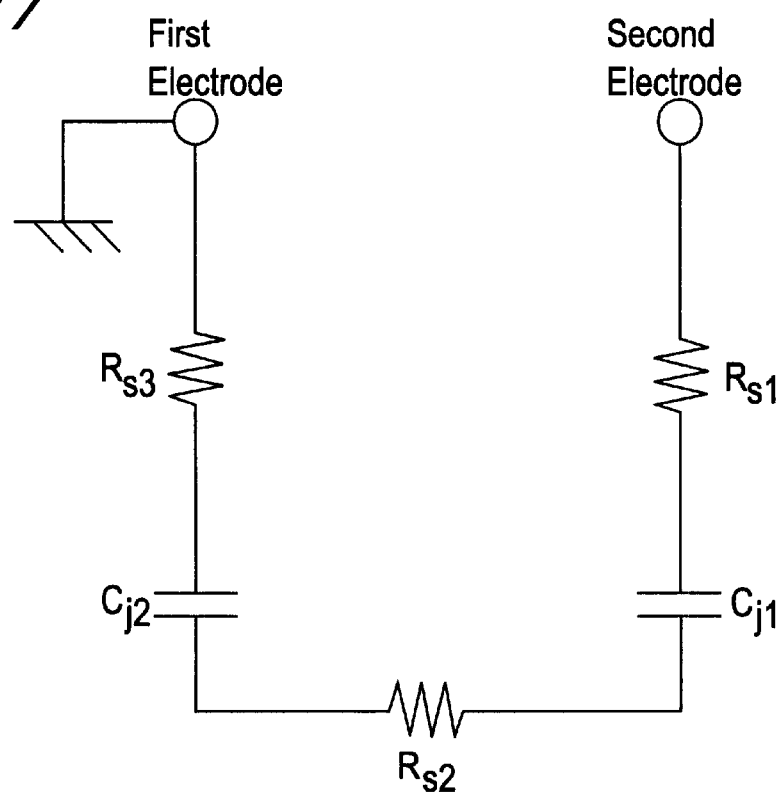
FIG. 11 is an equivalent electric circuit diagram of the optical modulation element of the second embodiment.

FIG. 11 is an equivalent electric circuit of the light modulation element of the second embodiment.

In the second embodiment, at least a part of the second insulating layer 36c contacts the substrate 12. Therefore the optical modulation element 70 of the embodiment becomes the equivalent electric circuit shown in FIG. 11.

In FIG. 11, a reference character RS1 indicates the resistance of the p-InP cladding layer 18, Cj1 the junction capacitance of the first junction structure part 20, RS2 the resistance of the n-InP cladding layer 14, Cj2 the junction capacitance of the second junction structure part 26, and RS3 the resistance of the p-InP sub-cladding layer 24.

Figure 1B:
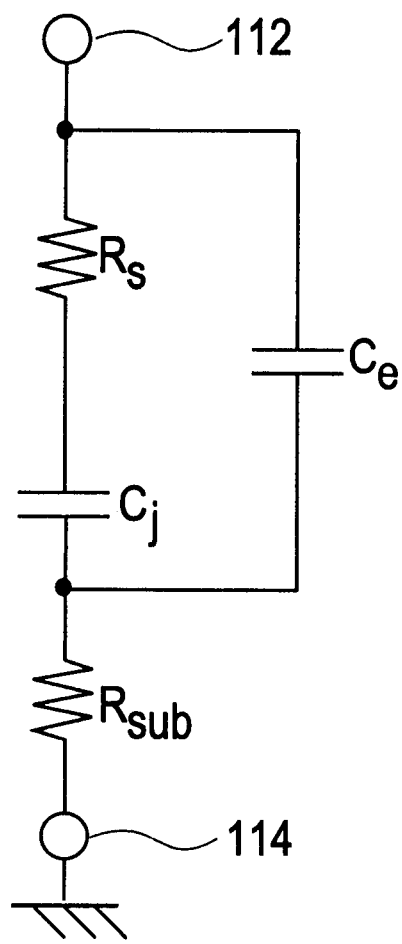
FIG. 1B is an equivalent electric circuit diagram of the element in FIG. 1A.

Compared with a conventional equivalent electric circuit diagram (FIG. 1B) and the equivalent electric circuit of the second embodiment (FIG. 11), the pad capacitance can be decreased to be small enough where it can be ignored, since the second insulating layer 36c under the electrode pad 44 contacts the substrate 12. Static capacitance can be decreased since the first electrode 42 and the second electrode 46 are arranged on the same plane isolated from each other. The capacitance of the entire element depends on the junction capacitance of the first junction structure part 20 and the junction capacitance of the second junction structure part 26. In a conventional plane parallel plate type element, on the other hand, static capacitance Ce is large since the electrodes 112 and 114 are plane parallel plate types, and the sum of the static capacitance Ce and the junction capacitance Cj of the double heterojunction structure 108 becomes the total capacitance.

As the equivalent electric circuit diagram clearly shows, the capacitance of the element can be dramatically decreased in the case of the element of the second embodiment.

Figure 12:
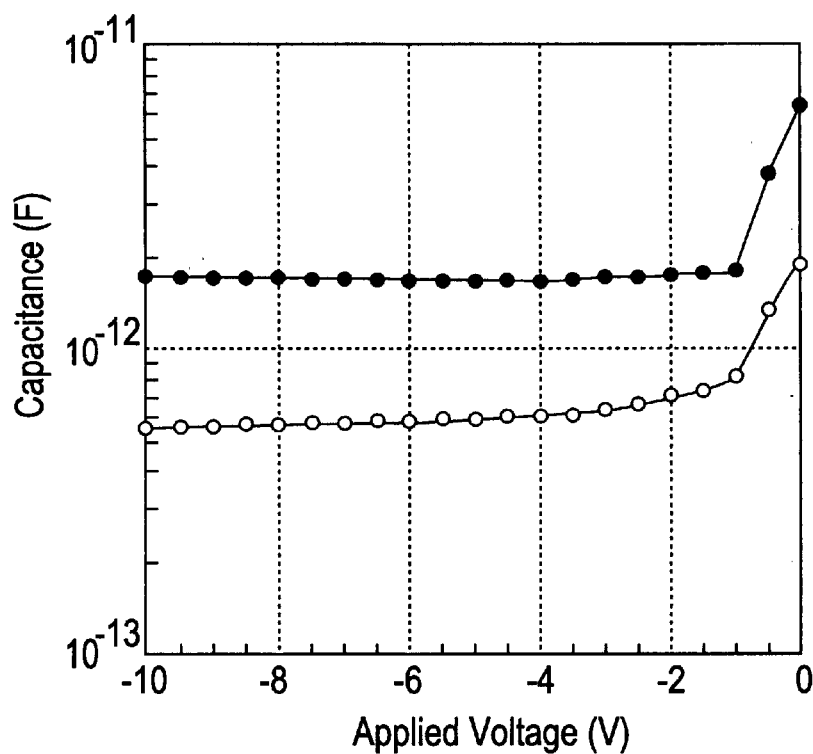
FIG. 12 is a C-V characteristic diagram of the optical modulation device of the first and second embodiments.

FIG. 12 is a C-V characteristic diagram depicting the measurement result of the electric capacitance when reverse bias voltage is applied to the first electrode 42 of the element 70 of the second embodiment. The abscissa is the applied voltage (V) and the ordinate is the capacitance (F).

FIG. 12 also shows the C-V characteristic curve of the element 10 of the first embodiment, where the second insulating layer does not contact the semiconductor substrate. The characteristic curve of the element of the first embodiment is indicated by the curve with black dots, and the characteristic curve of the element of the second embodiment is indicated by the curve with white dots.

In the element 10 of the first embodiment, the first electrode 42 and the second electrode 46 are formed on the same plane (see FIG. 2 and FIG. 3), therefore the static capacitance decreases more than the static capacitance of the plane parallel plate type element. While the element 10 has a pad capacitance between the electrode pad 44 continuing from the first electrode 42 and the n-InP cladding layer 14, the element of the second embodiment can dramatically decrease not only the static capacitance, but also the pad capacitance between the electrode pad 44 and the n-InP cladding layer 14.

Therefore, as shown in FIG. 12, the capacitance of the element 70 of the second embodiment can be decreased about 0.5 pF from the capacitance of the element 10 of the first embodiment.

Here the position where the second insulating layer 36c and the semiconductor substrate 12 contact is outside a light waveguide channel 72, which includes the light waveguide layer 16 of the first junction structure part 20 and the peripheral area thereof.

To fabricate the element of the second embodiment, a groove 74, which reaches the substrate 12, is formed at a part of the n-InP cladding layer 14 directly under the electrode pad 44, and then the first insulating layer 36a and the second insulating layer 36c, which buries this groove 74 and both sides of the first mesa-shaped part 32, are formed so that the second insulating layer 36c and the substrate 12 contact (see FIG. 8 and FIG. 9). If this groove 74 is formed at a part of the n-InP cladding layer 14 included in the light waveguide channel 72, then the waveguide status of the light which passes through the light waveguide channel 72 may be changed. For example, if the second insulating layer 36c is formed using polyimide, light scattering may be generated by the roughness of the inner wall of the formed groove 74. This light scattering may cause major waveguide loss.

The contact pail between the second insulating layer 36c and the substrate 12 plays a role of isolating a part 14p of the n-InP cladding layer directly under the electrode pad from the second electrode 46, which is grounded, and the n-InP cladding layer 14, which is connected up to a pail directly under the electrode pad via the second junction structure 26, so that the n-InP cladding layer 14 directly under the electrode pad 44 does not have a potential close to the grounding potential (see FIG. 8 and FIG. 9). Since the electrode pad 44 is formed continuing from the first electrode 42, it is preferable to have the contact part directly under the electrode pad 44, closer to the first electrode 42, to decrease the pad capacitance between the electric pad 44 and the n-hnP cladding layer 14.

As a result, it is preferable to form the contact part between the second insulating layer 36c and the substrate 12 in an area outside the area of the light waveguide channel 72, and directly under the electrode pad 44, closer to the first electrode side 42.

In the present embodiment, the groove 74, which has an opening edge diameter of 2 µm, is formed at a 10 µm depth, reaching the Fe-doped InP substrate 12 at a part of the n-InP cladding layer isolated from the boundary of the first electrode 42 and the electrode pad 44, that is, the boundary of the first mesa-shaped part 32 and the second insulating layer 36c, to the 5 µm electrode pad 44 side. The first insulating layer 36a and the second insulating layer 36c are formed so as to bury this groove 74 and both sides of the first mesa-shaped part 32. By this, the second insulating layer 36c, which has a structure where a part contacts the semiconductor substrate 12, can be formed.

A structure where a part of the second insulating layer 36c and the semiconductor substrate 12 contact can be applied to each element structure in FIG. 4A–FIG. 4C, which were described for the first embodiment.

Figure 10A:
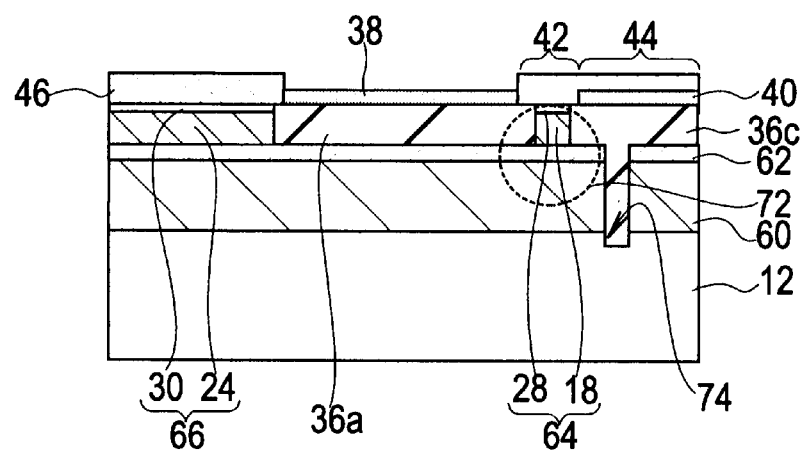
FIG. 10A, FIG. 10B and FIG. 10C are diagrams depicting configurations of variant forms of the semiconductor optical modulation element of the second embodiment, shown by cross-sectional views corresponding to FIG. 8.
Figure 10B:
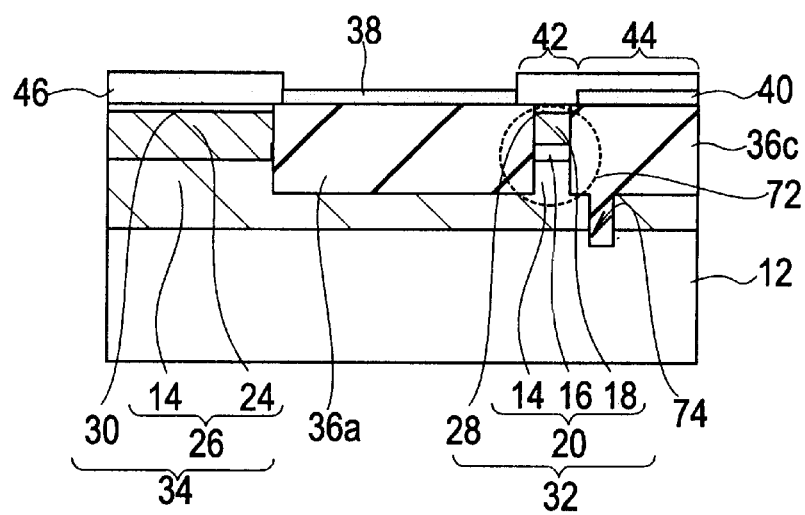
Figure 10C:
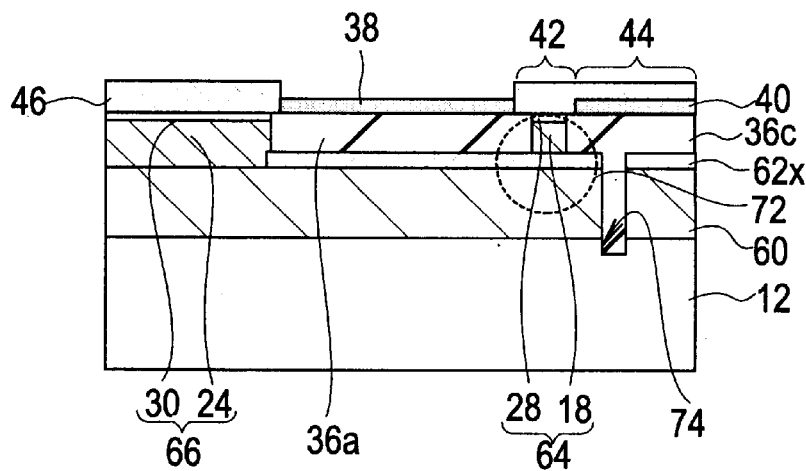

FIG. 10A–FIG. 10C are diagrams depicting variant forms of the optical modulation element of the second embodiment, respectively, showing cross-sections similar to FIG. 9.

FIG. 10A is a variant form applied to the element in FIG. 4A. FIG. 10B is a variant form applied to the element in FIG. 4B. FIG. 10C is a variant form applied to the element in FIG. 4C. In any of the elements having the above structure, the pad capacitance between the electrode pad 44 and the n-InP cladding layer 14 can be decreased. Since the capacitance of the entire element can be decreased, the high-speed response and the low electric reflection characteristic of the element can be improved.

The element.70 of this embodiment and the element of each variant form are mounted to the support element for heat radiation, and constitutes the optical modulation device (see FIG. 5), just like the first embodiment.

In the element 70 of the present embodiment, the height from the top surface of the semiconductor substrate 12 to the top surface of the first electrode 42, and the height from the top surface of the semiconductor substrate 12 to the top surface of the second electrode 46 are substantially the same. Also, the top surfaces of the first electrode 42 and the second electrode 46 are formed substantially on the same plane, just like the element of the first embodiment, and both the first electrode 42 and the second electrode 46 can be bonded to the mounting face side of the support element for heat radiation with good adhesion. In the present embodiment, the support for heat radiation is a carrier. The electric signal application side electrode and the grounding side electrode are formed so as to be electrically isolated from each other on the mounting face of the carrier. To the electric signal application side electrode, the top surface of the first electrode 42 is bonded by such a suitable method as soldering and thermo-compression bonding. Just like the first electrode 42, the top surface of the second electrode 46 is bonded to the grounding side electrode, so the first electrode 42 and the second electrode 46 side of the element, which are closer to the heat generation source, can be securely contacted to the support element for heat radiation, and the heat radiation of the device can be improved.

Since the adhesion of the first electrode 42 and the second electrode 46 with the carrier is good, electric resistance due to contact problems, does not increase. The optical modulation device of the second embodiment is also a device which excels in long term reliability.

The above mentioned first and second embodiments are merely examples of the embodiments of the present invention. Therefore, the present invention is not limited to the above described embodiments.

In the above mentioned example, a semi-insulating Fe-doped InP substrate is used as a semiconductor substrate, but a substrate having an opposite polarity from the polarity of the first conductivity type cladding layer or a substrate having the same polarity as the first conductivity type cladding layer, which has an impurity density which is lower than the impurity density of the first conductivity type cladding layer, may be used.

As a material which constitutes the electric insulating layer, which buries both sides of the first mesa-shaped part (the first insulating layer and second insulating layer), organic insulating material containing Fe-doped InP, non-doped InP or polyimide may be used.

InP was used as the material of the first conductivity type cladding layer, the second conductivity type cladding layer and the second conductivity type sub-cladding layer, but such a semiconductor as GaAs may be used instead.

The light waveguide layer was a non-doped lnGaAsP layer, but a light waveguide layer with a (multi) quantum well structure, which is often used as the light waveguide layer of an optical modulation device, may be used, or a light waveguide layer having a lattice distortion structure, may also be used.

In the first and second embodiments, the optical modulation device was described as an example of the semiconductor optical function device of the present invention, but the device configuration of the invention can be applied to an optical phase modulator and a Mach-Zahnder interferrometer type optical modulator as a semiconductor optical function device.

For example, a Mach-Zehnder interferrometer type optical modulator constitutes a Mach-Zehnder interferrometer using a branch waveguide channel which corresponds to a beam splitter. Electrodes are arranged so as to apply an electric field to this waveguide channel arm, and the intensity of output light is modulated. The configuration of the present invention is applied to the waveguide channel arm and the part of the electrodes which applies the electric field to the waveguide channel arm. In this case, each branch of the waveguide channel aim has a double heterojunction structure, and an electrode is formed thereon, respectively. The heights of the electrodes are substantially the same. By this, two electrodes and the mounting faces can be bonded respectively with good adhesion when the electrodes are mounted to the carrier by turning the electrodes to the mounting face side of the carrier because two electrodes and the mounting face can be bonded with good adhesion, so the heat radiation of the device can be improved. When patterns, which are electrically isolated from each other, are formed on the mounting face of the carrier and the electrodes are bonded to the patterns, respectively, each electrode can be bonded to the pattern without tilting the device, so contact problems do not occur. As a result, a device which excels in long term reliability can be obtained.

As the above description clearly shows, in the semiconductor optical function device of the present invention, the first junction structure part comprises the first conductivity type cladding layer, the light waveguide layer and the second conductivity type cladding layer on the semiconductor substrate. The second junction structure part includes the first conductivity type cladding layer and the second conductivity type, sub-cladding layer. The first junction structure part and the second junction structure part are formed at positions isolated from each other. The first electrode is formed above the double heterojunction structure part. The second electrode is formed above the second junction structure part. In this device, the height from the top surface of the semiconductor substrate to the top surface of the first electrode, and the height from the top surface of the semiconductor substrate to the top surface of the second electrode are substantially the same.

If this device is mounted to the support element for heat radiation such that the side of the first electrode and the second electrode (top surface side of the semiconductor substrate) contacts the support element for heat radiation, then the top surface of both the first electrode and the second electrode can be contacted to the support element.

Here, the support element for heat radiation may be a heat sink provided at the carrier, or may be the carrier itself. At the part contacting the electrode of the support element for heat radiation, patterns are formed so as to electrically isolate electrodes from each other. Therefore, the first electrode and the second electrode contact each pattern of the support element for heat radiation, respectively.

Since the heights of the top surfaces of the two electrodes are substantially the same, the contact status between the support element for heat radiation and the top surfaces of the two electrodes are good, and the bonding area of the support element for heat radiation and the electrodes can be wide. Also, the heat radiation of the device can be improved. Additionally, the adhesion strength between the electrodes and the support element for heat radiation can be increased. Since each electrode and the pattern formed at the support element can be electrically connected, the electric resistance of the device is not increased. As a result, a desired long term reliability can be obtained.

What is claimed is:

1. A semiconductor optical function device comprising:
   a semiconductor substrate;
   a first junction structure part formed on said semiconductor substrate, said first junction structure part including a first conductivity type cladding layer, a light waveguide layer, and a second conductivity type cladding layer;

a second junction structure part formed at a position separated from said first junction structure part on said semiconductor substrate, said second junction substrate part including said first conductivity type cladding layer and a second conductivity type sub-cladding layer;

a first electrode formed on said first junction structure part; and a second electrode formed on said second junction structure part, wherein heights of said first electrode and said second electrode from a surface of said semiconductor substrate are substantially the same, and said first electrode and said second electrode are parallel to each other in a direction of propagation of light through said light waveguide layer.

2. The semiconductor optical function device according to claim 1, wherein said second junction structure part has a double heterojunction structure which further includes an non-doped layer between said first conductivity type cladding layer and said second conductivity type sub-cladding layer.

3. The semiconductor optical function device according to claim 2, further comprising an insulating layer formed on said first conductivity type cladding layer, wherein said light waveguide layer and said second conductivity type cladding layer of said first junction structure part and said second conductivity type sub-cladding layer of said second junction structure part are isolated by said insulating layer.

4. The semiconductor optical function device according to claim 1, wherein said second junction structure part has a homojunction structure which comprises said first conductivity type cladding layer and said second onductivity type sub-cladding layer.

5. The semiconductor optical function device according to claim 4, further comprising an insulating layer formed on said first conductivity type cladding layer, wherein said light waveguide layer and said second conductivity type cladding layer of said first junction structure part and said second conductivity type sub-cladding layer of said second junction structure part are isolated by said insulating layer.

6. The semiconductor optical function device according to claim 1, further comprising an insulating layer formed on said first conductivity type cladding layer, wherein said light waveguide layer and said second conductivity type cladding layer of said first junction structure part and said second conductivity type sub-cladding layer of said second junction structure part are isolated by said insulating layer.

7. The semiconductor optical function device according to claim 1, wherein said first electrode and said second electrode are bonded on a mounting side face of a support element for heat radiation.

8. A semiconductor optical function device comprising:
a substrate;
a first junction structure part formed on said substrate, said first junction structure part including a first conductivity type cladding layer, a light waveguide layer, and a second conductivity type cladding layer;
a second junction structure part formed at a position separated from said first junction structure part on said substrate, said second junction structure part including said first conductivity type cladding layer, a non-doped layer, and a second conductivity type sub-cladding layer;
a first insulating layer formed on said first conductivity type cladding layer adapted to isolate said light waveguide layer and said second conductivity type cladding layer of said first junction structure part from said non-doped layer and said second conductivity type sub-cladding layer of said second junction structure part;

a second insulating layer formed on said first conductivity type cladding layer at a side of said first junction structure part opposite to a side contacting said first insulating layer;

a first electrode formed on said first junction structure part; and a second electrode formed on said second junction structure part, wherein heights of said first electrode and said second electrode from a surface of said substrate are substantially the same, and said first electrode and said second electrode are parallel to each other in a direction of propagation of light through said light waveguide layer.

9. The semiconductor optical function device according to claim 8, wherein said light waveguide layer and said non-doped layer are formed as continuous layers on said first conductivity type cladding layer, said second conductivity type cladding layer and said second conductivity type sub-cladding layer are isolated by said first insulating layer formed on a side of said light waveguide layer and a side of said non-doped layer, and said second insulating layer is formed on another side of said light waveguide layer opposite to said side contacting said first insulating layer.

10. The semiconductor optical function device according to claim 9, wherein said second junction structure part has a homojunction structure which comprises said first conductivity type cladding layer and said second conductivity type sub-cladding layer.

11. The semiconductor optical function device according to claim 8, wherein said second junction structure part has a homojunction structure which comprises said first conductivity type cladding layer and said second conductivity type sub-cladding layer.

12. The semiconductor optical function device according to claim 8, wherein said first electrode and said second electrode are bonded on a mounting side face of a support element for heat radiation.

13. A semiconductor optical function device comprising:
a substrate,
a first junction structure part formed on said substrate, said first junction structure part including a first conductivity type cladding layer, a light waveguide layer, and a second conductivity type cladding layer;
a second junction structure part formed at a position separated from said first junction structure part on said substrate, said second junction structure part including said first conductivity type cladding layer, a non-doped layer, and a second conductivity type sub-cladding layer;
a first insulating layer formed on said first conductivity type cladding layer so as to isolate said light waveguide layer and said second conductivity type cladding layer of said first junction structure part from said non-doped layer and said second conductivity type sub-cladding layer of said second junction structure part;
a second insulating layer formed on said first conductivity type cladding layer at a side of said first junction part opposite to a side contacting said first insulating layer, wherein a part of said second insulating layer contacts said substrate;

a first electrode formed on said first junction structure part; and a second electrode formed on said second junction structure part, wherein heights of said first electrode and said second electrode from a surface of said substrate are substantially the same, and said first electrode and said second electrode are parallel to each other in a direction of propagation of light through said waveguide layer.

14. The semiconductor optical function device according to claim 13, wherein said light waveguide layer and said non-doped layer are formed as continuous layers on said first conductivity type cladding layer, said second conductivity type cladding layer and said second conductivity type subcladding layer are isolated by said first insulating layer formed on a side of said light waveguide layer and a side of said non-doped layer, and said second insulating layer is formed on another side of said light waveguide layer opposite to said side contacting said first insulating layer.

15. The semiconductor optical function device according to claim 14, wherein said second junction structure part has a homojunction structure which comprises said first conductivity type cladding layer and said second conductivity type sub-cladding layer.

16. The semiconductor optical function device according to claim 13, wherein said second junction structure part has a homojunction structure which comprises said first conductivity type cladding layer and said second conductivity type sub-cladding layer.

17. The semiconductor optical function device according to claim 13, wherein said first electrode and said second electrode are bonded on a mounting side face of a support element for heat radiation.

* * * * *